United States Patent [19]

Stauffer

[11] Patent Number: 4,830,718
[45] Date of Patent: May 16, 1989

[54] REMOVAL OF SULFUR DIOXIDE ($SO_2$) FROM WASTE GASES AND RECOVERY AS SULFURIC ACID

[76] Inventor: John Stauffer, 6 Pecksland Rd., Greenwich, Conn. 06830

[21] Appl. No.: 40,185

[22] Filed: Apr. 17, 1987

Related U.S. Application Data

[63] Continuation-in-part of Ser. No. 789,490, Oct. 21, 1985, abandoned.

[51] Int. Cl.⁴ .................................................. C25B 1/22
[52] U.S. Cl. .................................... 204/104; 204/92; 204/93; 55/73; 423/242; 423/522; 423/528
[58] Field of Search ......................... 204/92, 93, 104; 423/242 R, 174, 522, 528; 55/73

[56] References Cited

U.S. PATENT DOCUMENTS

| | | | |
|---|---|---|---|
| 704,831 | 7/1902 | Jacobs | 204/104 |
| 755,247 | 3/1904 | Salom | 204/104 |
| 825,057 | 7/1906 | Johnson | 204/104 |
| 928,844 | 10/1908 | DeBriailles | 204/104 |
| 2,021,936 | 11/1935 | Johnstone | 423/242 R |
| 3,836,630 | 9/1974 | Noguchi et al. | 423/242 A |
| 3,944,401 | 3/1976 | Dorr et al. | 423/242 R |
| 4,120,669 | 10/1978 | Amendola | 423/522 |
| 4,213,958 | 7/1980 | Cameron et al. | 423/522 |
| 4,281,821 | 8/1981 | Kawazoe et al. | 423/522 |
| 4,284,608 | 8/1981 | Pessel | 423/242 R |

FOREIGN PATENT DOCUMENTS

| | | | |
|---|---|---|---|
| 0670966 | 1/1939 | Canada | 423/242 R |
| 2755327 | 6/1979 | Fed. Rep. of Germany | 423/242 R |
| 42514 | 12/1959 | Poland | 204/104 |

OTHER PUBLICATIONS

Kohl, Arthur L. and Riesenfeld, Fred C., *Gas/Purification*, 3rd. E. (1979) p. 344.

Primary Examiner—Robert L. Stoll
Attorney, Agent, or Firm—Krass & Young

[57] ABSTRACT

A process is provided by means of acid scrubbing in combination with electrolysis for removing sulfur dioxide from a waste gas stream such as effluent vent of flue gas, for purposes of economy, for achieving a useful by-product, and for minimizing environmental pollution.

8 Claims, 2 Drawing Sheets

REMOVAL OF SULFUR DIOXIDE (SO₂) FROM WASTE GASES AND RECOVERY AS SULFURIC ACID

REFERENCE TO A RELATED APPLICATION

This application is a continuation-in-part of my co-pending application Ser. No. 789,490, filed Oct. 21, 1985, now abandoned.

FIELD OF THE INVENTION

The present invention concerns a process for removing sulfur dioxide from a waste gas stream such as effluent vent, flue or exhaust gas, for purposes of economy, for achieving a useful by-product, and for minimizing environmental pollution.

BACKGROUND OF THE INVENTION

Description of the Prior Art

Various methods have been described for the removal of sulfur dioxide from a waste gas stream. Sulfur dioxide is an environmental pollutant that is implicated as the chief source of acid rain. Among the methods for controlling $SO_2$ may be mentioned the methods described in U.S. Pat. Nos. 3,515,513 3,523,755, 3,542,511, 3,510,923, 3,475,122, 3,655,547, 4,059,496, 4,306,950, 4,421,726, and 4,528,173.

A majority of these methods resort to the use of alkaline solutions containing sodium or lime to remove sulfur dioxide. Others propose to oxidize sulfur dioxide with air or oxygen using catalysts to promote the reaction. Additional processes make use of oxidizing reagents such as hypochlorite to convert sulfites to sulfates.

The available emission control methods present certain technical difficulties and economical disadvantages. The alkaline scrubbing processes produce waste products that are useless and a problem to dispose of. In the catalytic processes, the catalysts may become fouled and lose their activity. Oxidizing reagents are costly, require precise metering, and are thermally unstable.

It is therefore an object of the present invention to provide a process for the removal of sulfur dioxide from waste gases that overcomes the disadvantages of the conventional methods.

It is also an object to provide a process for the recovery of sulfur values from vent or flue gas as a valuable by-product while avoiding an air pollution problem.

It is a further object to provide a process of the kind mentioned which is relatively economical and does not require the use of catalysts or oxidizing reagents.

These and other objects, features and advantages of the invention will be apparent from the accompanying drawing and the following description.

SUMMARY AND DETAILED DESCRIPTION

In one preferred embodiment the invention concerns a process for removing sulfur dioxide from effluent vent or flue gas, by subjecting the gas cyclically to scrubbing in an acid stream and to electrolysis. The process comprises the steps of scrubbing the gas in a confined scrubbing zone with an aqueous sulfuric acid stream to remove sulfur dioxide from the gas and convert the thus removed sulfur dioxide to sulfurous acid, subjecting the sulfuric acid stream containing the thus produced sulfurous acid to electrolysis in an electrolytic cell to oxidize the sulfurous acid to sulfuric acid, recycling the sulfuric acid stream resulting from the electrolysis step to the scrubbing zone, and maintaining the recycled sulfuric acid within a predetermined range of concentration by means of make-up water or acid.

The range of concentration of sulfuric acid in the acid stream is determined largely by electrical conductivities. For dilute aqueous sulfuric acid, from under 5 weight percent acid up to the concentration of oil of vitriol, namely, 93.19 weight percent acid, the conductivities in mho/cm²×10⁴ at 18° C., are greater than 1000. In the range between 5 weight percent and 70 weight percent the values of conductivities exceed 2000, and within the limits of 20 weight percent and 40 weight percent the values are above 6500.

The scrubbing zone conveniently is the chamber contained within an absorber of scrubbing column of conventional design or modified design for passage of a stream of effluent gas therethrough. Preferably, the scrubbing column contains packing material that provides gas-liquid contact surface for the gas stream and the aqueous acid stream. The design of the packing material is critical in order to minimize channeling and thereby achieve greater scrubbing efficiency.

In a preferred embodiment of the process, the packing material is electrically conductive and serves both as a gas-liquid contact surface for scrubbing and as the electrochemically active surface of the of the electrolytic cell. From time to time, as desired, the by-product sulfuric acid is withdrawn in desired quantity from the acid stream. This is done, for example, while adding or making-up with water to lower the acid concentration to a predetermined level. In a preferred embodiment, the dissolved sulfur dioxide in the acid stream is kept at a minimum concentration by operating at a low current density which in turn is accomplished by employing an anode with increased area, preferably by employing an anode comprising electrically conductive packing in the scrubbing column.

BRIEF DESCRIPTION OF THE DRAWINGS

The invention will be better understood by reference to preferred embodiments illustrated in the accompanying drawing in which.

DETAILED DESCRIPTION OF THE PREFERRED EMBODIMENTS

Figure 1:
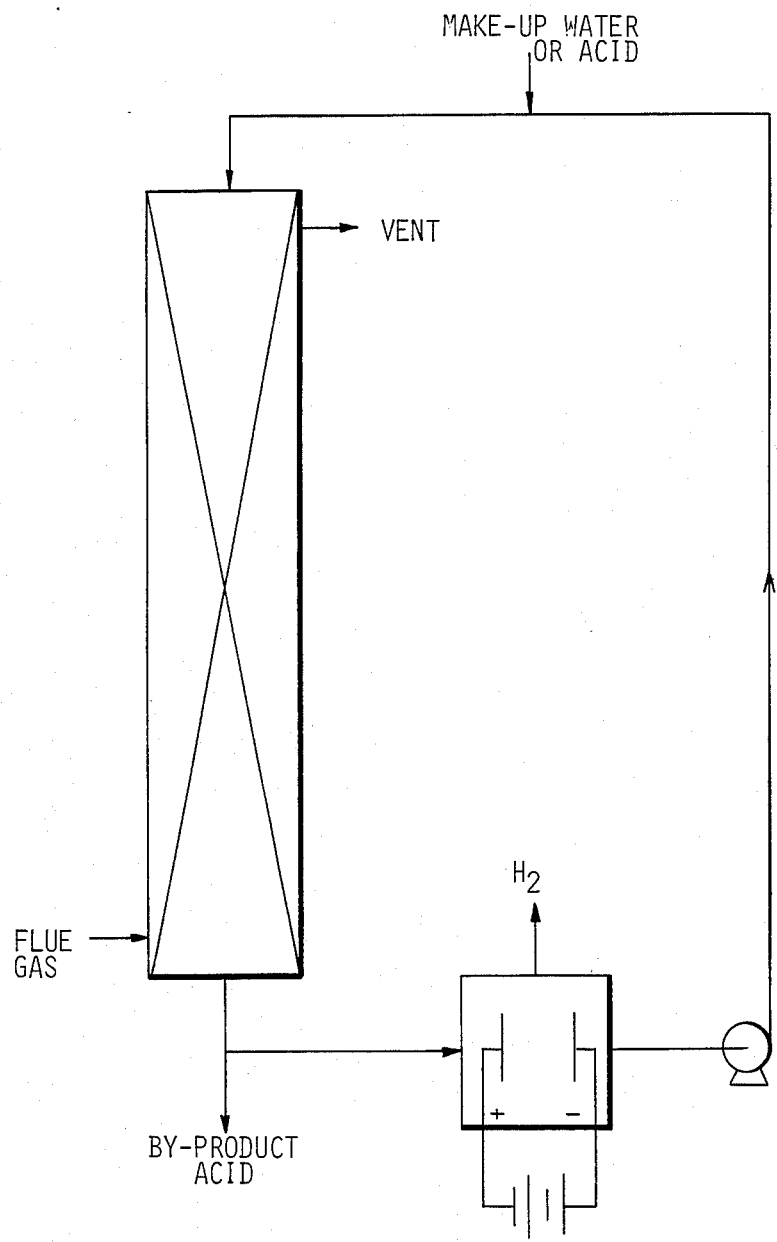
FIG. 1 is a diagrammatic view of a scrubber and a electrolytic cell in series with a pump for acid-stream-processing of flue gas through the scrubber and cycling the acid stream via the cell back to the scrubber.

Electrolysis according to the invention is an effective and efficient method of converting sulfurous acid (as well as $SO_2$), to sulfuric acid. No additive is introduced which might contaminate the by-product acid produced. There are no catalysts which may become fouled. Because the electrochemical potential for the reaction is relatively low, the cost of power is moderate. In short, the present electrolytic process has the important advantage that it is direct and simple to operate.

In the electrolytic cell according to the invention, the following reaction take place: At the anode $$H_2SO_3 + H_2 \rightarrow SO_4^= + 4H^+ + 2e^-$$

$$E^0 = -0.20v$$

and at the cathode $$2H^+ + 2e^- \rightarrow H_2$$

$$E^0 = 0v.$$

The net reaction therefore is $$H_2SO_3 + H_2O \rightarrow 2H^+ + SO_4^= + H_2$$

$$E^0 = -0.20v.$$

An additional reaction at the anode is as follows:

$$H_2SO_3 + H_2O \rightarrow HSO_4^- + 3H^+ + 2e^-$$

$$E^0 = -0.11v.$$

The above reaction is favored since the equilibrium constant, K, equals $1.3 \times 10^{-2}$ for the following reaction:

$$HSO_4^- \rightarrow H^+ + SO_4^=.$$

Therefore the power requirements are less than would be the case if the sulfuric acid were completely disassociated. The above theoretical electrode potentials, however, only indicate the relative power needs. In practice, the theoretical voltages cannot be obtained because of electrode polarization. To overcome this irreversibility, a significant overvoltage must be applied equal to the minimum potential of about 0.6 volts. Also sufficient voltage must be applied to compensate for the potential drop in the electrolyte. Notwithstanding these less than ideal conditions, power costs are tolerable, especially when the process is applied to the special case of scrubbing of power plant flue gases which power plants ipso facto have wholesale electric power available.

A general expression for the total cost of removing sulfur dioxide pollutant is:

$$S = Ec + U - R$$

where S is the unit cost, E is the cell voltage, C is the cost of electricity, U is the fixed cost, i.e. amortization, insurance, maintenance, etc., and R is credit given for by-product acid.

If the applied voltage across the cell is increased sufficiently, an additional reaction takes place at the anode:

$$NO + 2H_2O \rightarrow NO_3^- + 4H^= + 3e-$$

$$E = -0.96v.$$

The invention contemplates the use of this reaction to strip nitric oxide from flue gases containing this pollutant. Like sulfur dioxide, nitric oxide is only slightly soluble in water but is readily solubilized and removed when oxidized to nitric acid.

The capacity of a pollution control unit to remove sulfur dioxide by the present invention is readily adjustable so that upsets can be handled. For example, any surge in the volume of vent gas or increase in sulfur dioxide concentration can adequately be met. This result is accomplished by raising the applied voltage thus causing an increase in electrode current density. To cope with emergencies or irregularities the potential across the electrodes can be raised as high as 1.7 volts, which is the potential where nascent oxygen begins to form. The applied cell voltage would thus be equal to the potential across the electrodes plus the potential through the electrolyte. The latter value is dependent on the acid conductivity and cell geometry.

One preferred embodiment of the invention is shown in FIG. 1. Vent or flue gases are contacted at ambient temperature or higher but below the acid's boiling point in an absorber or scrubbing column with a downstream of dilute aqueous sulfuric acid. This acid stream strips the sulfur dioxide from the gas stream. The acid containing the absorbed sulfur dioxide is passed to an electrolytic cell which converts the $SO_2$ as sulfurous acid to more sulfuric acid. Hydrogen is vented from the cell. The electrodes must stand up to the corrosive conditions and therefore are fabricated from suitable inert electrode material such as lead, graphite, platinum, palladium, or ruthenium.

By operating the process with dilute sulfuric acid, the electrical resistance is minimized. Acid between 20% and 40% by weight has the greatest conductance and is preferred. It also rapidly absorbs sulfur dioxide. In order to maintain this concentration, make-up water or concentrated acid must be added depending on the moisture content of the flue gas. By-product acid is withdrawn from the system as it is produced.

A preferred modification of the process provides an improvement in its efficiency. In order to remove a maximum amount of sulfur dioxide from the gas stream, the dissolved sulfur dioxide in the acid must be maintained at a minimum concentration. This result, as indicated, can be achieved by increasing the area of the anode. A further advantage of increasing the anode area is that the overvoltage can thereby by reduced as the current density drops.

Figure 2:
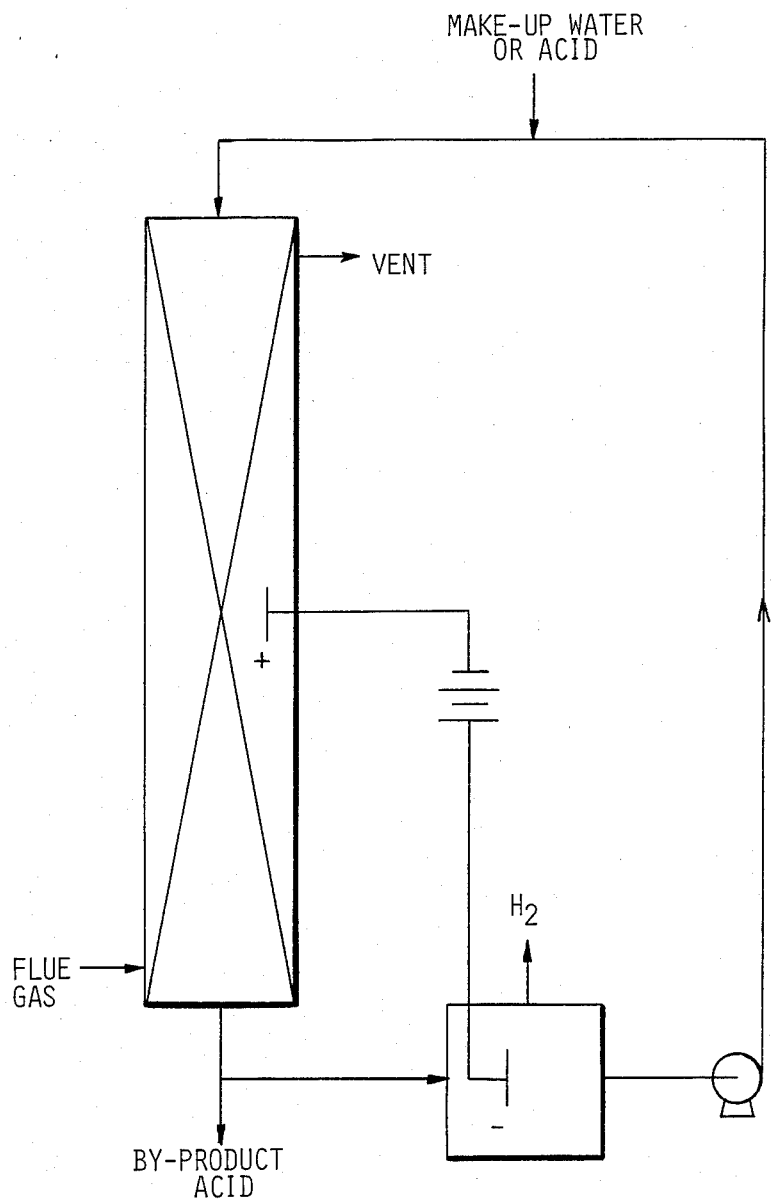
FIG. 2 is a similar view in which the anode of the electrolytic cell is located as gas-liquid contact packing with the scrubber.

One preferred way of enlarging the anode area is by using the packing in the scrubbing column for the dual purposes of providing gas-liquid contact surface and also serving as the anode. This design has the further advantage of improving the transport of sulfite ions through the diffusion layer. In this application, the packing must be made of an electrically conductive material such as graphite, graphite treated with a noble metal, or platinum-plated zirconium. FIG. 2 shows the layout of the process in which the column packing functions as the anode.

One of the principal advantages of the present invention is that a valuable by-product is produced. The weak acid with or without nitrogen values may be used in the production of fertilizer. Alternatively, the acid may be concentrated and purified by procedures well known to the trade. This concentrated acid may be used for many industrial purposes, thus improving the economics of the pollution control process.

The potential applications of the present invention are numerous, but four uses stand out as being particularly significant. The process can be applied to the cleaning of flue gases from power plants that burn high sulfur coal or fuel oil. Environmental pollution including acid rain are thereby reduced. Another application is in the control of sulfur dioxide from smelters that roast sulfide ores.

Thirdly, the process can be used to clean the vent gases from contact sulfuric acid plants. The process controls excessive emissions of sulfur dioxide during plant start-up and any upsets in the operation. It also allows greater utilization of plant capacity without contributing additional emissions of sulfur dioxide to the atmosphere. The weak acid produced by the process is recycled to the acid plant for fortification.

Finally, the process is used to treat flue gases from waste incinerators. The potential sources of sulfur dioxide include high sulfur fuel used to operate the incinerator, vulcanized rubber goods, and certain plastics. By incorporating an oxidizing agent such as dichromate or permanganate into the scrubbing solution in a odor-inhibiting quantity (e.g. 5 wt. %) odors from traces of organic substances can be minimized. The oxidizing agent is rejuvenated by the electric current during the electrolysis step.

The embodiments of the invention in which exclusive property or privelage is claimed are defined as follows:

1. A process for the mitigation and control of air pollution caused by the emission of sulfur dioxide in effluent vent, flue or exhaust gas, said process comprising the removal of sulfur dioxide from such effluent vent, flue or exhaust gas by means of steps in a continuous cycle of scrubbing the gas in a confined scrubbing zone with an aqueous acid stream comprising sulfuric acid ranging in concentration between about 5 to 93 weight percent to solubilize and remove sulfur dioxide from the gas and convert the thus removed sulfur dioxide to sulfurous acid, subjecting the acid stream containing the thus produced sulfurous acid to electrolysis in an electrolytic cell comprising an anode and a cathode, applying a potential across said electrodes of about 0.6 volts to about 1.7 volts, to oxidize the sulfurous acid to sulfuric acid, recycling the acid stream resulting from the electrolysis step to the scrubbing zone, while maintaining the concentration of the aqueous acid stream by means of make-up water or acid, and repeating said continuous cycle of steps of scrubbing with the stream, subjecting the scrubbing stream to electrolysis, and recycling the electrolyzed stream for scrubbing while maintaining the concentration of the scrubbing stream.

2. A process according to claim 1 where the range of concentration of sulfuric acid in the acid stream is from about 5 to about 70% by weight.

3. A process according to claim 1 where the range of concentration of sulfuric acid in the acid stream is from about 20 to about 40% by weight.

4. A process according to claim 1 where the scrubbing zone is contained within an absorber or scrubbing column for passage of a stream of effluent gas therethrough.

5. A process according to claim 4 where the scrubbing column contains packing material that provides gas-liquid contact surface for the gas stream and the aqueous acid stream.

6. A process according to claim 5 where the packing material is electrically conductive and serves both as a gas-liquid contact surface for scrubbing and as the electrochemically active surface of the anode for the electrolytic cell.

7. A process according to claim 1 comprising the step of withdrawing by-product sulfuric acid from the acid stream.

8. A process according to claim 1 where the electrolysis comprises the reaction $$H_2SO_3 + H_2O \rightarrow 2H^+ + SO_4^= + H_2$$

$$E^o = -0.20v.$$

* * * * *

UNITED STATES PATENT AND TRADEMARK OFFICE
CERTIFICATE OF CORRECTION

PATENT NO. : 4,830,718
DATED : May 16, 1989
INVENTOR(S) : Stauffer

It is certified that error appears in the above-identified patent and that said Letters Patent is hereby corrected as shown below:

Column 2, line 16, "of scrubbing" should be --or scrubbing--.

Column 2, line 64, "reaction" should be --reactions--.

Column 2, line 66, "$H_2$" should be --$H_2O$--.

Column 3, line 51, "$4H^=$" should be --$4H^-$--.

Column 5, line 16, "privelage" should be --privilege--.

Signed and Sealed this

Twenty-sixth Day of May, 1992

*Attest:*

DOUGLAS B. COMER

*Attesting Officer*      *Acting Commissioner of Patents and Trademarks*